United States Patent
Kim

[19]

[11] Patent Number: 5,956,982
[45] Date of Patent: Sep. 28, 1999

[54] AUTOMOBILE THEFT PROTECTION DEVICE TO BE LOCKED ON STEERING WHEEL THAT PROTECTS AUTOMOBILE EVEN AFTER THE STEERING WHEEL RIM CUT LOOSE

[76] Inventor: Chong Hun Kim, 17227 New Hope St., Fountain Valley, Calif. 92708

[21] Appl. No.: 09/143,749

[22] Filed: Aug. 29, 1998

[51] Int. Cl.[6] ................................................. B60R 25/02
[52] U.S. Cl. ............................................. 70/209; 70/226
[58] Field of Search ............................. 70/207, 209, 211, 70/212, 225, 226, 237, 238

[56] References Cited

U.S. PATENT DOCUMENTS

| | | | |
|---|---|---|---|
| 1,386,414 | 8/1921 | Lawrence | 70/226 |
| 1,429,334 | 9/1922 | Furber | 70/209 |
| 1,448,658 | 3/1923 | Furber | 70/211 |
| 4,882,920 | 11/1989 | Wu | 70/209 |
| 5,052,201 | 10/1991 | Liou | 70/209 |
| 5,297,406 | 3/1994 | Lin | 70/209 |
| 5,452,597 | 9/1995 | Chen | 70/226 X |
| 5,491,990 | 2/1996 | Von-Lambert | 70/209 |
| 5,513,506 | 5/1996 | Ricalde | 70/209 |
| 5,636,538 | 6/1997 | Openiano | 70/209 |
| 5,676,001 | 10/1997 | Ho | 70/226 X |
| 5,842,360 | 12/1998 | Somerfield | 70/226 X |

FOREIGN PATENT DOCUMENTS

| | | | |
|---|---|---|---|
| 2263454 | 7/1993 | United Kingdom | 70/226 |

*Primary Examiner*—Lloyd A. Gall

[57] ABSTRACT

The present invention relates to a mechanical device that protects auto-theft. It is to be installed on steering wheel and has the following merits over existing devices. These are: 1) automobile can not be stolen even after they cut steering wheel-rim on both sides of the device, 2) it is adjustable to fit any type of steering wheel, and 3) it takes a simple pushing to lock up the device to the automobile steering wheel, and unlocking the key-operated lock to the device releases it from the automobile steering wheel automatically.

2 Claims, 4 Drawing Sheets

5,956,982

AUTOMOBILE THEFT PROTECTION DEVICE TO BE LOCKED ON STEERING WHEEL THAT PROTECTS AUTOMOBILE EVEN AFTER THE STEERING WHEEL RIM CUT LOOSE

BACKGROUND OF THE INVENTION

1. Field of the Invention

The present invention relates to auto-theft protection device that user may install on steering wheel, designed to protect auto-theft even after the steering wheel rim on both sides of the device cut loose.

2. Description of the Related Art

Numerous automobiles have been stolen in the United States every day in spite of the fact that there are many types of auto-protection devices being used. The most popular device is the CLUB®, but it has a problem that needs to be corrected in order to provide full protection of automobile. The problem is that the CLUB® becomes useless once they cut the steering wheel-rim on the both sides of the CLUB®. It is known that a special tool has been developed to cut the steering wheel-rim. This tool impairs the function of the CLUB®, and many automobiles are being stolen even though the CLUB® s are being used. This invention is to correct the CLUB®'s deficiency and provide full protection of automobile.

BRIEF SUMMARY OF THE INVENTION

This device is designed to be installed at the intersection (1) where the automobile steering wheel spoke meets the steering wheel rim. It has high strength steel cover (2) covering the intersection area so that it can protect the mechanism underneath from being tampered or dismantled. Cutting the rim (3) on both sides of the cover can not remove the device from the steering wheel. It also has a feature that makes this device possible to fit any size of steering wheel spoke. FIG. 2 shows an open slot (6) through which the rim slips in into the space where it stays while being locked up. Pushing the piston bar (4) toward the steering wheel center closes up the space and locks the device to the steering wheel. FIG. 3 shows the closed configuration. FIG. 4 shows a feature designed for the device to fit any type of steering wheel. There are two legs (7) to be placed across the spoke (5). These two legs are basically male screws that can be screwed in and out, and moved from one location to another to fit the spoke. This movement is possible only when this device is removed from the steering wheel. Once locked in the steering wheel, the legs can not be unscrewed or removed because the wings on the legs encounter the steering wheel rim as they try to rotate. A set of two springs (see FIG. 6) is installed to push back the piston bar (4) automatically and unlock the device as user unlocks the key-operated lock (9). The key-operated lock (9) refers to locking system that locks the device (see FIG. 3).

DETAILED DESCRIPTION OF THE INVENTION

Figure 1:
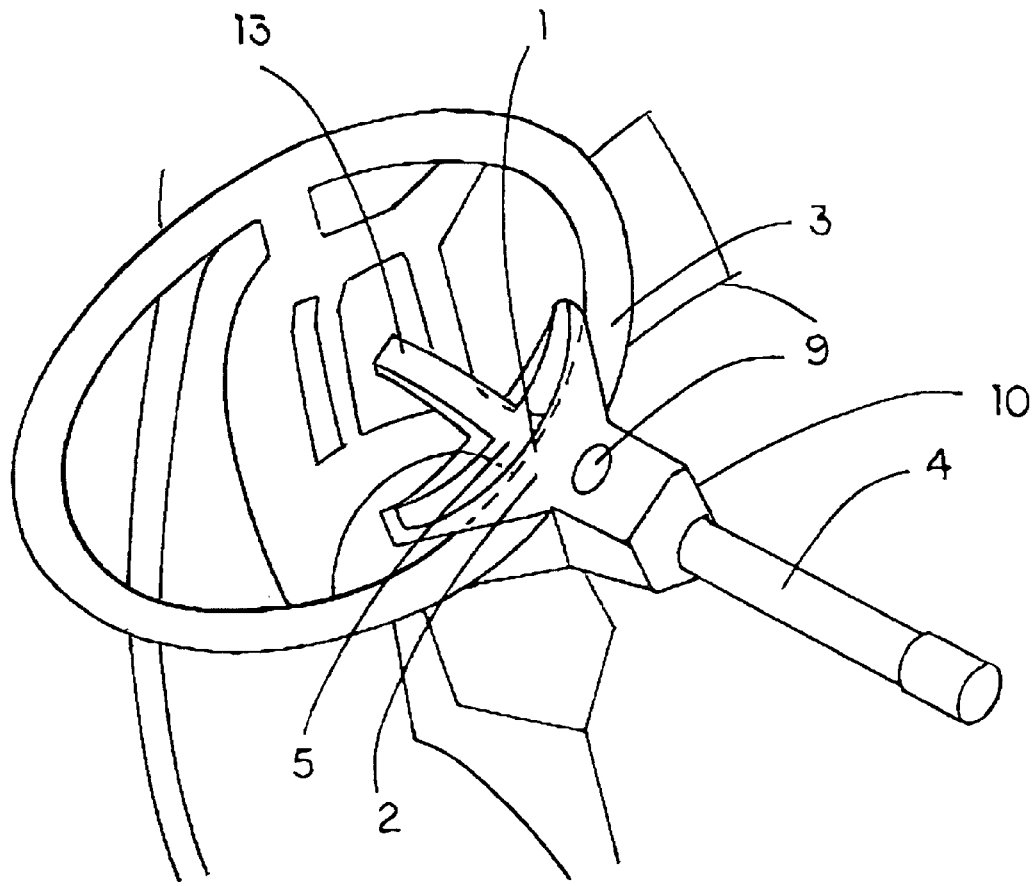
FIG. 1 is a preferred perspective view of the device showing how it is installed on the steering wheel.

A preferred embodiment of the present invention will now be described in connection with FIG. 1, 2, 3, 4, 5, 6, 7, and 8 of the drawing.

FIG. 1 shows a preferred view of how the said device is to be installed. User places the device (in unlocked state) at the intersection (1) where the steering spoke meets the steering rim, and then drops the device down with the spoke (5) between the two legs (7). Then, pushes the piston bar (4) toward the steering wheel center. As it reaches the end of the stroke, the key-operated lock system (9) will lock the piston bar (4), and lock up the device to the steering wheel. The length of the piston bar (4) remained after being pushed into the main body (10) is long enough to make it impossible to drive. It has high strength steel cover (2) covering the intersection (1) so that it can protect the locking mechanism underneath from being tampered or dismantled, and thus, even cutting the rim (3) on both sides of the cover can not remove the device from the steering wheel. It also has a high strength steel extruded part(13) pointing toward the center of the steering wheel. This part is to protect the steering wheel spoke (5), and also to be used for user to hold on to as he/she installs it on or removes it from the steering wheel. The shape of the part (13) is convex to fit any shape of the steering wheel. The key-operated lock (9) is placed at center so that it can be reached by user readily.

Figure 2:
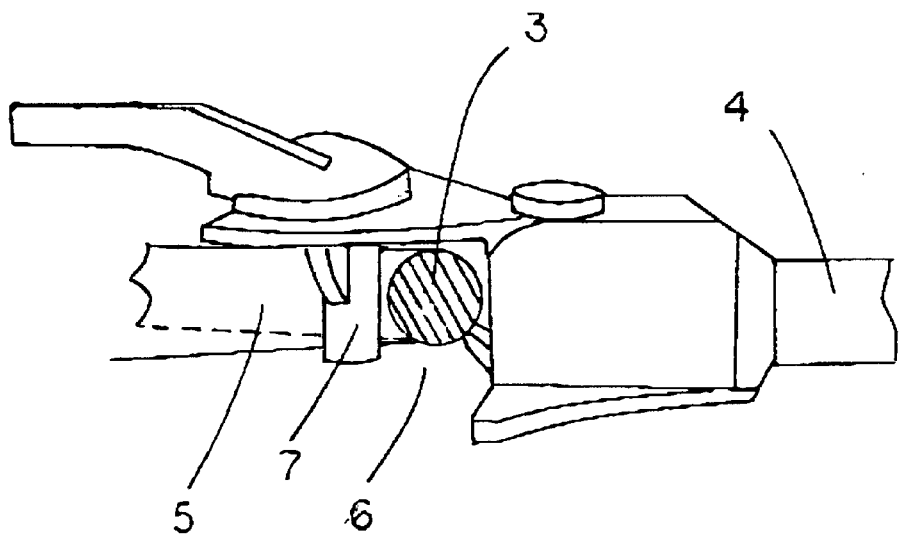
FIG. 2 show a preferred side view before it is locked. Notice that there is an opening slot (6) through which the steering wheel rim (3) enters into a space where it resides while being locked. It also shows the cross section of the rim (3) inside the space.

FIG. 2 shows a preferred side view of the device. It shows a configuration when the device is placed at the intersection just before being locked up. It is seen here the cross section of the rim (3) is surrounded by the top side wall, right wall, and the legs (7) at left side. But the bottom is still open. The rim is to be inserted through this bottom opening slot (6).

Figure 3:
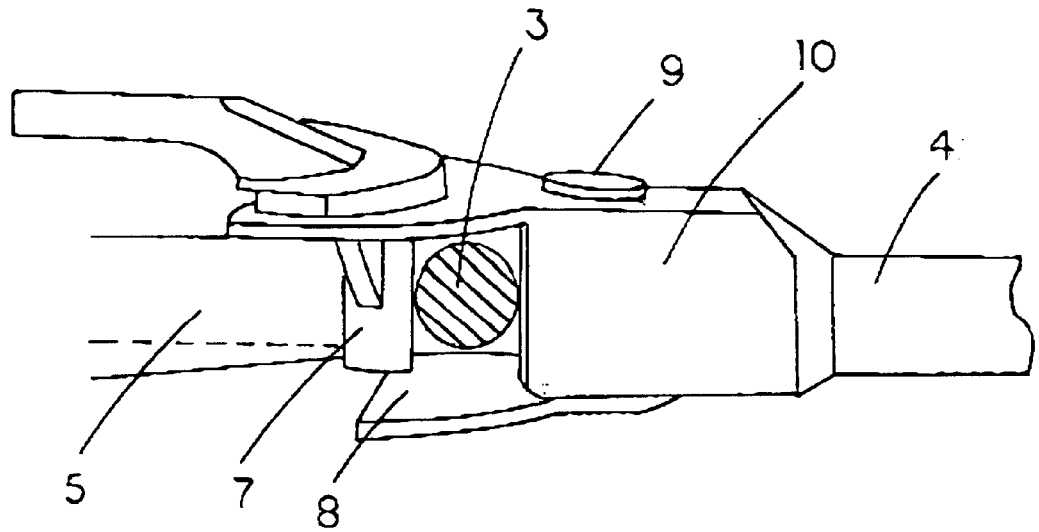
FIG. 3 shows a preferred view of the device when it is locked. Notice that the spade (8) blocks the opening slot (6) (shown in FIG. 2) and prevents the rim from being released. The spade (8) is a part of the piston bar (4).

FIG. 3 shows a preferred side view of the device when it is locked It is seen here that the bottom slot (6) (see FIG. 2) is closed by a spade (8) so that the rim (3) can not be removed. The spade (8) is solidly connected to the piston bar (4). As the piston bar (4) is being pushed toward the center of the steering wheel, the spade (8) closes up the space as shown in the figure.

Figure 4:
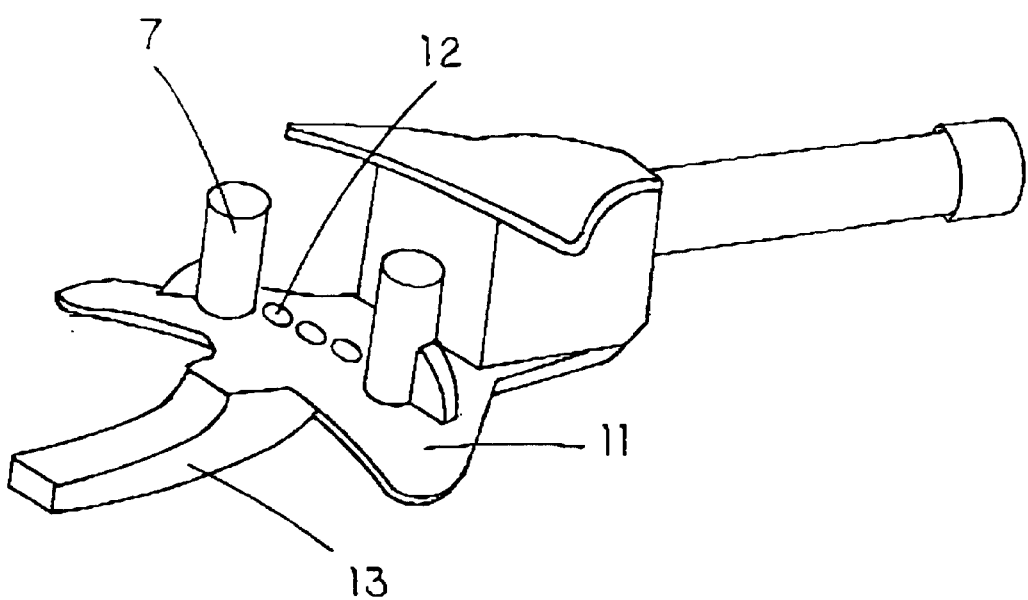
FIG. 4 shows a preferred view of how the legs (7) are placed. Notice that there are screw holes (12). The legs (7) are to be placed in any one of these screw holes (12) to secure proper distance between the two legs (7) to fit any size of the steering wheel spoke (5).

FIG. 4 shows a preferred view of how the legs (7) are placed on the plate (11). Before using the device, user places the legs (7) at proper location such that the distance between the two legs (7) is a little larger than the width of the steering spoke (5) so that the spoke (5) can fit between these two legs (7). Then, screws them in into the screw holes (12) The legs are made of high strength material and its diameter is large enough to be uncuttable and small enough to fit.

Figure 5:
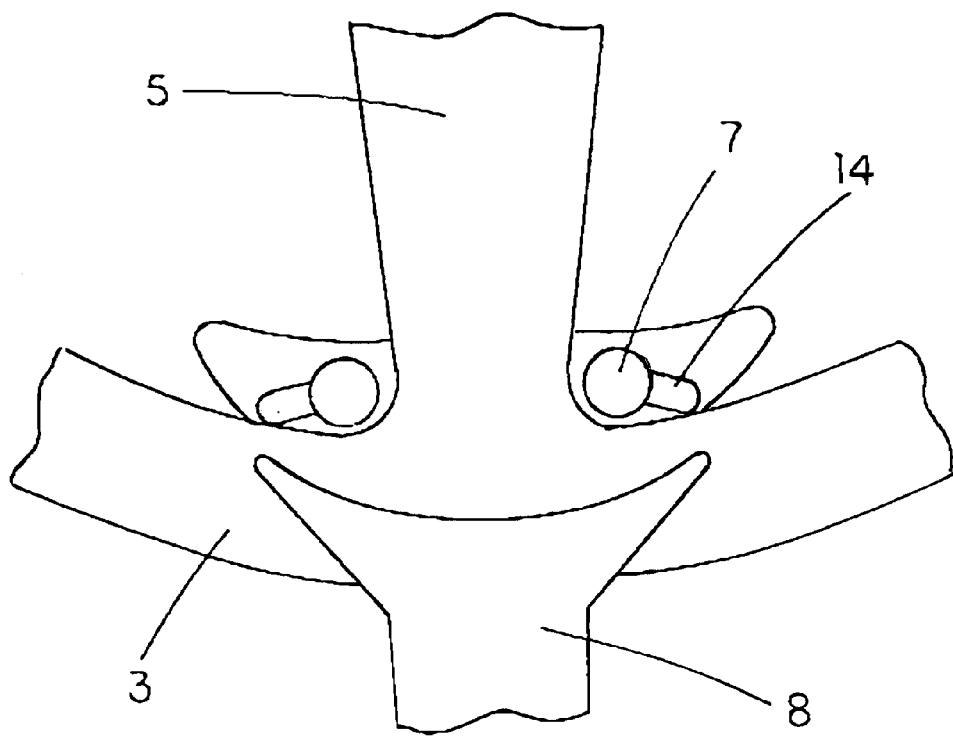
FIG. 5 shows a preferred view showing why the two legs (7) can not be removed from the device once the device is locked in the steering wheel.

FIG. 5 shows a preferred view showing why the two legs can not be removed from the device once the device is locked in. The figure shows leg-wing(14) attached to each leg. As shown in the figure, the leg-wing encounters the steering wheel rim as it tries to rotate, and thus, it prevents the leg from rotating any further. Therefore, these legs can not be removed from the device. It is to be noted that the right leg is right-handed screw and the left leg is left handed screw. Both screws are made such that when they complete screwing, the leg-wings must be placed outward as shown in the figure.

Figure 6:
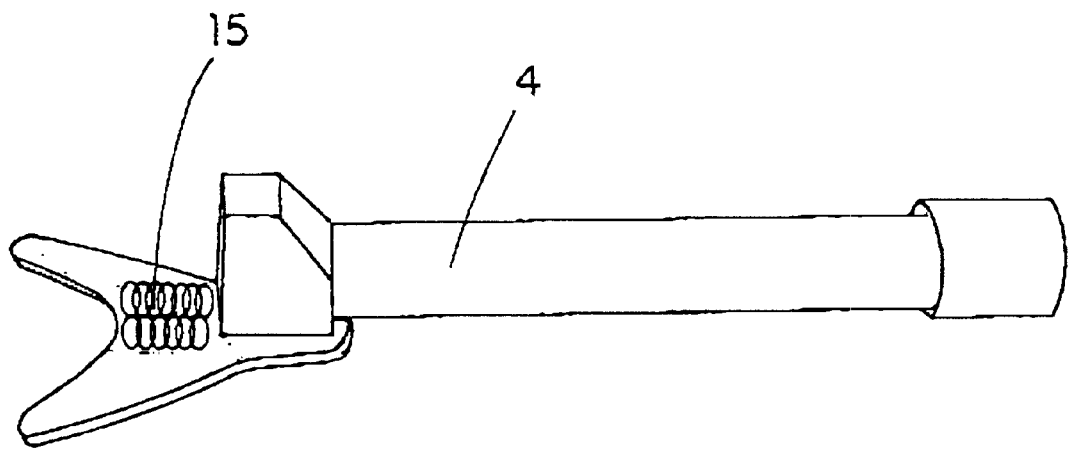
FIG. 6 shows a preferred view of a configuration in which a spring set (15) is placed to push back the piston bar automatically as being released.

FIG. 6 shows a preferred view showing where the springs are placed. These springs are designed to push back the piston bar (4) as user unlocks the key-operated lock.

Figure 7:
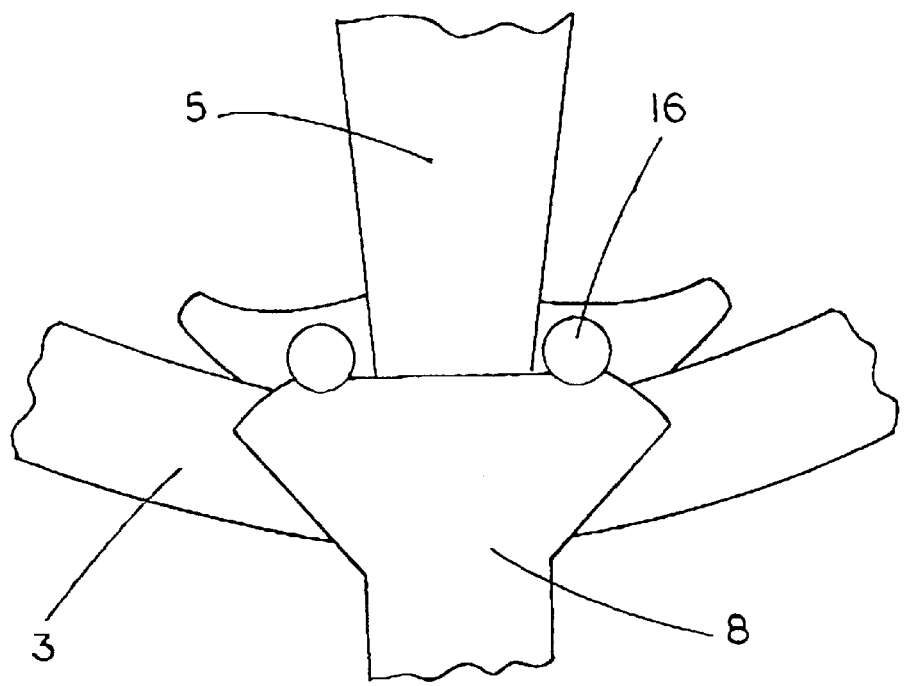
FIG. 7 shows first option of spade (8) in FIG. 5.

FIG. 7 shows an option of FIG. 5. In this figure, it is shown that the front edge of the spade(8) is inserted into 360 degree groove in the legs (16) to prevent the removal of the legs(16).

Figure 8:
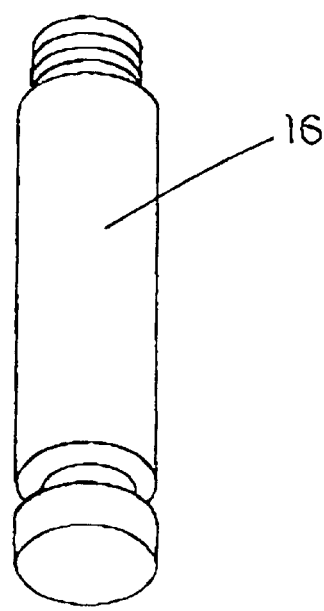
FIG. 8 shows first option of the leg (7) in FIG. 5.

FIG. 8 shows the leg (16) that has 360 degree groove near the top of the leg and male screw at the bottom.

I claim:

1. An auto-theft protection device for installation on the steering wheel of an automobile; comprising:
   (A) a high strength steel plate and a main body adapted to be installed over an intersection of a steering wheel spoke and a steering wheel rim,
   (B) a high strength steel part for protecting a steering wheel spoke area,
   (C) a key-operated lock,
   (D) a piston bar slidable into the main body to lock the device on a steering wheel, and to automatically slide outwardly from the main body upon unlocking of the key-operated lock,
   (E) a set of two screw-threaded legs adapted to be adjustably positioned in screw-threaded holes in the plate, and adapted to be installed on opposite sides of a steering wheel spoke,
   (F) a wing on each leg adapted to abut the steering wheel rim to prevent unscrewing of the legs from the plate.

2. An auto-theft protection device for installation on the steering wheel of an automobile; comprising:
   (A) a high strength steel plate and a main body adapted to be installed over an intersection of a steering wheel spoke and a steering wheel rim,
   (B) a high strength steel part for protecting a steering wheel spoke area,
   (C) a key-operated lock,
   (D) a piston bar slidable into the main body to lock the device on a steering wheel, and to automatically slide outwardly from the main body upon unlocking of the key-operated lock,
   (E) a set of two screw-threaded legs adapted to be adjustably positioned in screw-threaded holes in the plate, and adapted to be installed on opposite sides of a steering wheel spoke,
   (F) a spade on the piston bar adapted to engage a 360 degree groove in each leg to prevent unscrewing of the legs from the plate.

* * * * *